May 24, 1955

C. C. PINE 2,709,053

AUTOMATIC APPROACH SYSTEM

Filed May 14, 1952

INVENTOR
CECIL C. PINE
BY
Herbert H. Thompson
his ATTORNEY.

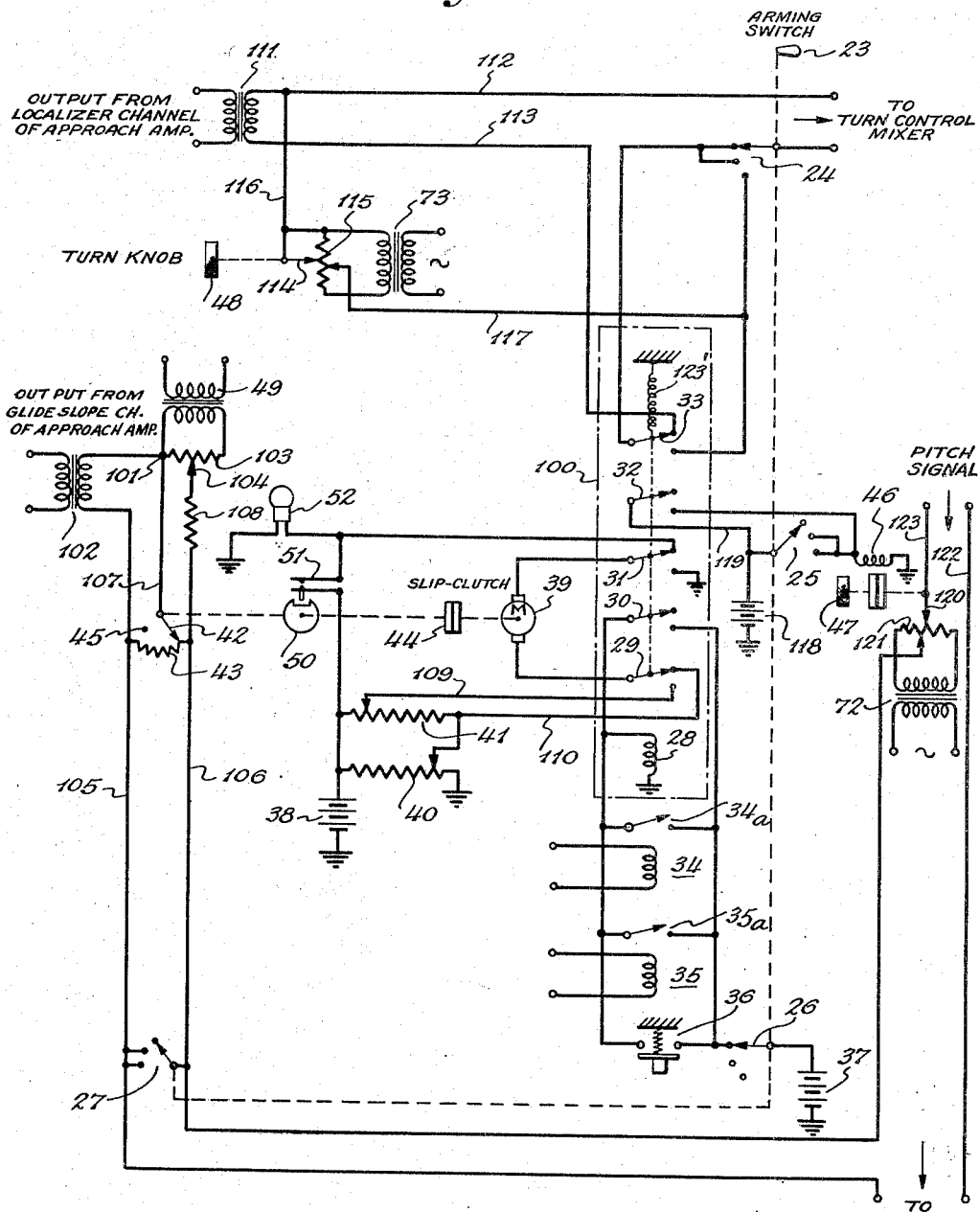

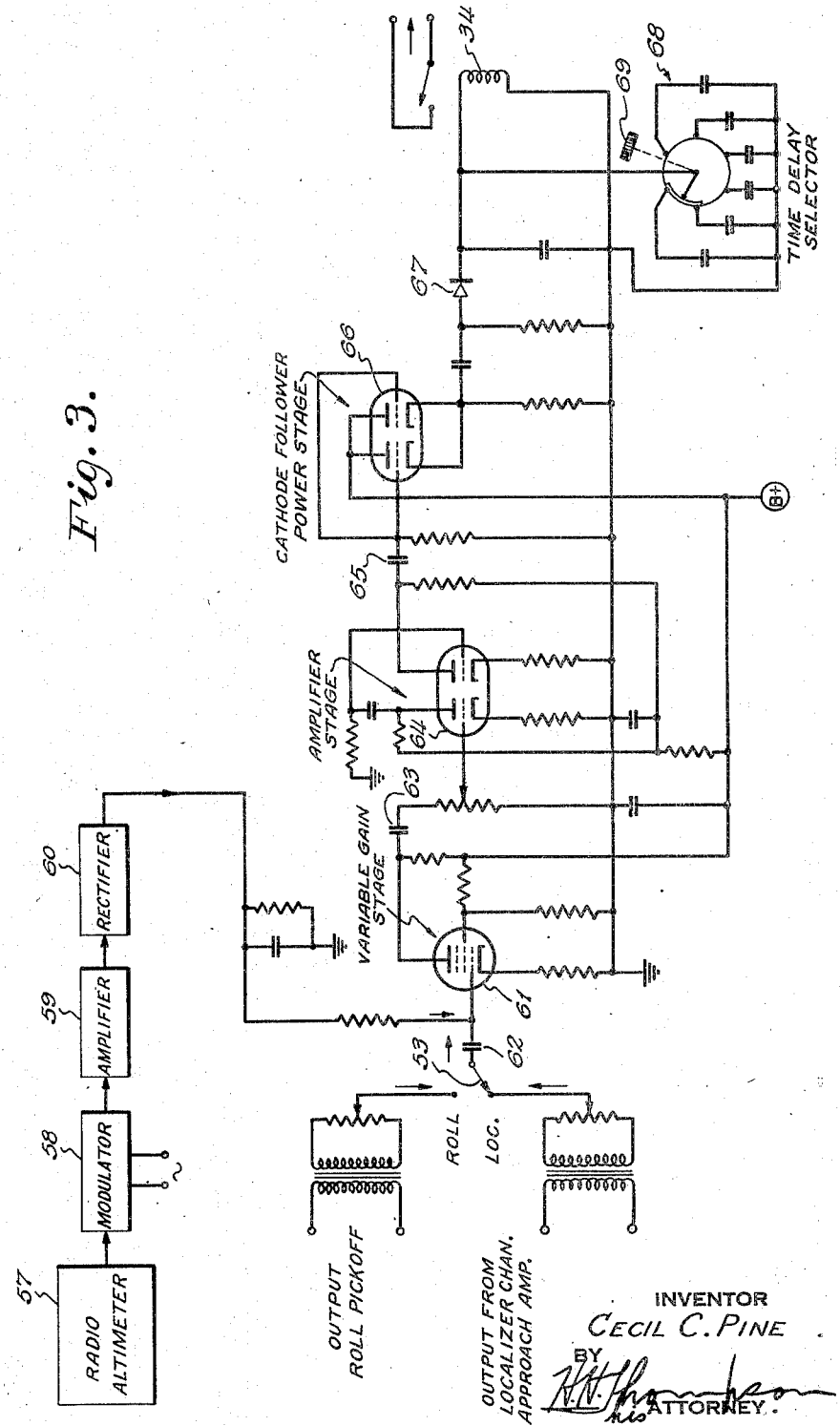

United States Patent Office 2,709,053
Patented May 24, 1955

2,709,053

AUTOMATIC APPROACH SYSTEM

Cecil C. Pine, Lake Ronkonkoma, N. Y., assignor to The Sperry Corporation, a corporation of Delaware Application May 14, 1952, Serial No. 287,728

22 Claims. (Cl. 244—77)

My invention relates to automatic approach systems for aircraft. More particularly, the present invention concerns means for evaluating the automatic approach of an aircraft and for automatically releasing the craft from control of the approach system and causing the aircraft to execute a fly-up maneuver should such evaluation ascertain that the aircraft is not making the automatic approach in accordance with given conditions of flight.

Automatic approach systems for aircraft commonly include radio receiving means having signal outputs for controlling an automatic pilot to tend to cause the craft so equipped to descend on a radio-defined flight path toward a landing field. The radio means generally comprises a localizer receiver from which is derived a control signal for controlling the automatic pilot in the horizontal plane of craft approach to the landing field and a glide slope receiver from which is derived a control signal for controlling the automatic pilot in the vertical plane of craft approach to the landing field.

A situation may arise involving an aircraft flying in a prescribed downward flight path toward an airport under the guidance of glide slope and localizer beams where it becomes evident from the nearness of the runway that further maneuvering of the aircraft beyond a predetermined extent in order to bracket the landing beams might result in disaster. This situation prevails when, for example, in the last stages of an approach the aircraft is acted upon by severe gusts of wind which give rise to a substantial displacement of the craft from the flight path defined by the landing beams. The radio approach being automatically effected through the craft's automatic pilot, said pilot is controlled so as to tend to restore the craft to its proper relation to the landing beams; and, in so doing, may cause the aircraft to bank or pitch an exceedingly dangerous amount for the close proximity of the aircraft to the runway. It becomes apparent, too, that less maneuvering is tolerable the closer the aircraft gets to the runway.

A partial solution to the safety problem created by circumstances of the foregoing nature, is set forth in copending application Serial No. 148,836 entitled, "Safety Device for Automatic Approach Systems," filed March 10, 1950, now Patent No. 2,611,128 issued September 16, 1952, and assigned to the assignee of the present application. This copending application discloses what may be termed a "go-around" feature for automatic approach systems. Means are provided therein whereby the human pilot monitoring an automatic approach upon observing a dangerous state of flight condition may manually initiate a severance of control of the craft's automatic pilot from the radio system and commence an automatic fly-up maneuver simultaneously therewith. Hence, the human pilot evaluates the approach, deciding whether flight conditions such as heading, pitch, bank, vertical displacement, and horizontal displacement, defining a given approach situation, betoken a successful completion of the approach. Moreover, the human pilot is also harnessed with the responsibility of tempering his evaluation with considerations of distance to the runway before deciding to initiate a "go-around."

The present invention provides means for unburdening the human pilot of the onerous task of continuously evaluating the conformance of his aircraft with safe conditions of flight on the radio approach path, and further relieves him of making the requisite decision to act. Said means are capable of automatically evaluating the situation at hand, and, without delay, acting, if necessary, to effect a "go-around," the "go-around" itself being actuated through means similar to those recited in said copending application.

The primary object of my invention is to improve automatic approach systems for aircraft.

Another object is to provide means for automatically evaluating the automatic approach of an aircraft to a landing field against given limits of flight conditions along the radio-defined approach path, the exceeding of which by the aircraft will cause automatic severance of control of the automatic pilot from the radio approach system and simultaneously place the aircraft in an attitude to fly up and away from the runway.

Another object of my invention is the provision, in an automatic approach system for aircraft, of monitoring control means for severing the radio receiver devices from control of the automatic pilot and for simultaneously adjusting said pilot to cause ascent of the craft, said control means being responsive when at least one of the following parameters attains a value corresponding to a preselected limit of safe craft movement relative to the radio-defined approach path: aircraft displacement from a localizer beam, rate of change of displacement from the localizer beam, aircraft rate of turn in yaw or bank angle, aircraft displacement from a glide-slope beam, rate of change of aircraft displacement relative to the glide-slope beam, and aircraft pitch.

Another object is to provide a control means of the foregoing character wherein at least one of said preselected limits of safe craft movement relative to the radio-defined approach path is varied substantially in accordance with the distance of the aircraft along the approach path from the runway.

With the foregoing and still other objects in view, my invention includes the novel combinations and arrangements of elements described below and illustrated in the accompanying drawings, in which:

Fig. 2 is a schematic wiring diagram of a preferred arrangement of the relays and go-around controller of Fig. 1; and Fig. 3 is a schematic wiring diagram of a preferred control arrangement for the upper relay of Fig. 1.

Figure 1:
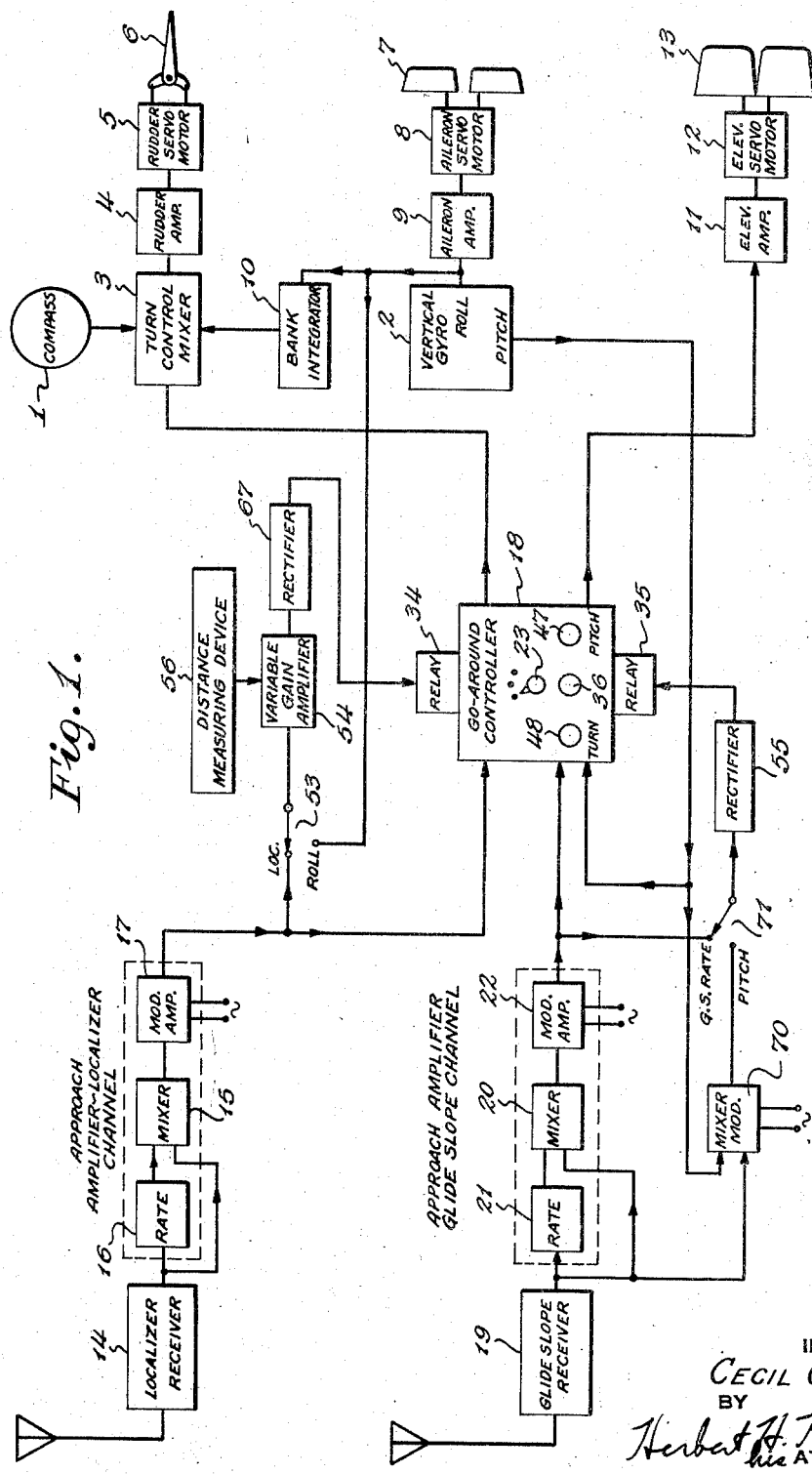
Fig. 1 is a block diagram schematically showing a preferred arrangement of the over-all system of my invention.

Referring to Fig. 1, I have shown my invention incorporated in a conventional automatic pilot of the electronic control type. Azimuth control is provided, for example, by compass 1 which is preferably of the magnetically slaved gyroscopic or gyro magnetic type, and control about the roll and pitch axes is preferably provided by a vertical gyroscope 2 equipped with the usual pick-offs for providing control signals in accordance with craft movement about said roll and pitch axes.

By the foregoing arrangement, heading signals are derived from compass 1 and fed into a turn control mixer 3, thence to a rudder amplifier 4 whose output drives a rudder servomotor 5 to position a rudder 6. Ailerons 7 are driven by an aileron servomotor 8 which is energized by the output of an aileron amplifier 9 whose input is derived from the roll pick-off of vertical gyroscope 2. A portion of the signal from said roll pick-off is fed to a bank integrator 10 and thence to mixer 3 to provide coordinated turns. The output of the pitch pick-off is amplified by an elevator amplifier 11 to drive an elevator servomotor 12 for positioning elevators 13.

Radio receiving means are also provided whereby the automatic pilot thus far described may be controlled for an automatic approach to a landing field. Accordingly, a conventional localizer receiver 14 may be employed for deriving a control signal dependent upon the displacement of the aircraft laterally of the radio-defined approach path. Said control signal is fed to a mixer 15 where it is mixed with a signal proportional to its first time derivative or rate provided by a suitable rate-taking means 16. Mixer 15 adds the two signals and feeds the sum thereof to a suitable modulator-amplifier means 17 whose output is fed via go-around controller 18 to mixer 3, as shown in Fig. 2 and hereinafter described, thereby providing a third, composite input signal to mixer 3 for use in controlling rudder 6, the three control signals being derived from compass 1, bank integrator 10 and localizer amplifier 17. Elevator 13 is similarly controlled jointly, but by a pitch signal derived from vertical gyroscope 2 and displacement and rate control signals provided by the glide slope channel of the approach amplifier, said latter signals being characteristic of the movement of the aircraft vertically relative to the glide slope beam. The displacement term is derived in a glide slope receiver 19 and is mixed with a rate signal proportional to the time rate of change of the displacement signal in a mixer 20, said rate being taken by a suitable rate-taking means 21. The output of mixer 20 is amplified in a modulator-amplifier 22 for transmission via go-around controller 18 to elevator amplifier 11.

Thus far, but for the placing of go-around controller 18 between the automatic pilot and the approach radio devices, the description has been concerned with a conventional automatic pilot which is adapted to be controlled by radio localizer and glide slope signals for an automatic approach to the runway of a landing field.

One of the primary functions of controller 18 is to provide means for severing control of the automatic pilot elevator channel from the signal output of the glide slope channel of the approach amplifier while substituting an arbitrary fly-up signal in controlling relation to the elevator channel of the automatic pilot. In effecting the foregoing operation, I prefer to bring about a gradual reduction of glide slope control signal to zero while concurrently gradually increasing the fly-up control signal to its arbitrary value. In this connection, a reversible motor 39 (Fig. 2) may be employed for slowly driving the wiper 42 of a potentiometer 43 which is connected across the leads 105, 106. Lead 105 is shown as being connected to one end of the secondary winding of a coupling transformer 102 whose primary is excited by the output from the glide slope channel of the approach amplifier. At its other end, said secondary winding is connected to a current dividing point, one lead 107 from said point being connected to the aforesaid wiper 42, another lead to one end of the secondary winding of another coupling transformer 49, and a third lead to a resistor 103 across the secondary of transformer 49. Resistor 103 has an adjustable tap 104 connected through resistor 108 to the aforesaid lead 106; and the primary of transformer 49 is excited from a suitable source of voltage, the fly-up signal being derived from resistor 103. With wiper 42 in the position shown in Fig. 2, itw ill be seen that substantially the total E. M. F. of the secondary of transformer 102 is supplied to leads 105 and 106 connected to the input of the elevator amplifier 11; and, hence, the entire glide slope signal is fed thereto in combination with the pitch signal from vertical gyroscope 2. However, when motor 39 is energized so as to drive wiper 42 clockwise, the glide slope signal is thereby gradually reduced and ultimately shorted out, and a fly-up signal from transformer 49 and its connected potentiometer 103, 104 is gradually substituted therefor. The signal from potentiometer 103, 104 is adjusted so as to cause the ascent of the aircraft at a predetermined safe attitude when the glide slope signal is shorted out. A stop 45 is preferably provided to stop the movement of wiper 42 when the glide slope signal is suppressed. When the stop is struck, motor 39 is allowed to continue its run by means of a slip clutch 44. The aircraft will then continue to climb at whatever rate is set at potentiometer 103, 104 until the pilot feels that he is a safe distance above the landing field. He then may move a switch knob 23 to disarm controller 18 thereby re-establishing normal automatic control in a manner hereinafter more particularly described.

In order reversibly to energize motor 39, I have provided two switches 29, 31 each having an upper position and a lower position. In their lower positions, motor 39 is energized for a go-around and drives wiper 42 in the clockwise direction, a circuit being described from ground through a battery 38, lead 109, switch 29, motor 39, switch 31, and back to ground. Besides driving wiper 42, motor 39 drives a cam 50 which is adapted to close a switch 51 connected between the upper contact of switch 31 and battery 38, said switch being opened only when wiper 42 is in the position remote from stop 45 as shown in Fig. 2. By this arrangement, with switch 51 closed and switches 29, 31 in their upper positions, motor 39 is thereby energized to drive wiper 42 in the opposite or counter-clockwise direction for recycling this portion of controller 18, the circuit now being described from ground through battery 38, switch 51, switch 31, motor 39, switch 29, and lead 110 back to ground. An indicating lamp 52 may also be energized through switch 51 to apprise the pilot of the actuation of the go-around controller.

Another primary function of controller 18 is to provide means for severing control of the automatic pilot rudder channel from the signal output of the localizer channel of the approach amplifier when the foregoing operations affecting the control of the elevator are performed. Accordingly, I have provided a switch 33 having an upper position and a lower or "go-around" position. With switch 33 in its upper position, as shown in Fig. 2, the signal output from the localizer channel is obtained through a coupling transformer 111 and is fed via leads 112, 133 to mixer 3 through a switch 24, more fully described hereinafter. However, with switch 33 in its lower or "go-around" position, lead 113 is opened, thereby severing control of the rudder channel from the localizer signal to accomplish the aforesaid other primary function of controller 18.

In the preferred embodiment, I have chosen to employ the lower position of switch 33 for also rendering a turn knob 48 effective. To accomplish this operation, knob 48 is adapted to position a wiper 114 of a potentiometer 115 connected across the secondary winding of a coupling transformer 73 whose primary winding is excited from a suitable source of voltage, a turn signal being derived from potentiometer 115. A lead 116 connects wiper 114 to mixer input lead 112, and a lead 117 connects a center tap of potentiometer 115 to mixer input lead 113, the latter connection being made through switch 33 in the lower position thereof. By this arrangement, the pilot is allowed to maneuver the aircraft in yaw through the automatic pilot when radio control of the latter is severed.

Preferably, I also provide an additional switch 32 having an upper position and a lower or "go-around" position, said switch being supplied for rendering a pitch knob 47 ineffective and effective, respectively. Accordingly, with switch 32 in its lower or "go-around" position, a connection is thereby made from ground through a battery 118 via lead 119 and switch 32 to the coil of a solenoid-actuated clutch 46 and thence back to ground. Thus energized, clutch 46 permits operation of knob 47 to position a wiper 120 of a potentiometer 121 connected across the secondary winding of a coupling transformer 72 whose primary winding is excited from a suitable source of voltage, a pitch signal being derived from potentiometer 121. By this arrangement, the pilot is allowed to modify the arbitary pitch attitude automatically given the aircraft during a go-around cycle.

Lead 106 running from the motor-driven potentiometer 43, hereinabove described, connects to a center tap of potentiometer 121, and wiper 120 connects to a lead 123 which with a lead 122 brings in the signal from the pitch pick-off of vertical gyroscope 2. By this arrangement, elevator amplifier 11 preferably is at all times at least partially controlled by a gyroscopically-derived pitch signal.

From the foregoing, it will be noted that in each instance the lower positions of switches 29, 31, 32, 33 constitute the "go-around" positions thereof. It, therefore, is desirable to provide means whereby all of said switches may be simultaneously placed in their lower positions when a "go-around" is called for. Accordingly, I prefer to incorporate the switches 29, 31, 32, 33 in a relay 100 having a field coil 28 and suitable spring means 123' for biasing said switches in their upper positions. A power source which may be a battery 37 is provided for energizing coil 28 and is connected to the coil for this purpose through a switch 26 and one or more switches 34a, 35a, 36 hereinafter more fully described. Moreover, relay 100 is preferably adapted to operate an additional switch 30 connected to provide a set of holding contacts for the relay.

Switch 26, in connecting the coil of relay 100 to a source of power, serves to arm or enable the go-around controller and is preferably operated simultaneously with a plurality of switches 24, 25, 27 by means of a switch knob 23. Each of the switches 24—27 has an upper, central and lower position of operation. For normal automatic flight, switch knob 23 is operated to place switches 24—27 in their lower positions. In this position, switch 24 serves to place rudder amplifier 4 under the control of compass 1 and turn knob 48. At the same time, switch 25 excites the coil 46 of the solenoid-actuated clutch of pitch knob 47 so that the pitch knob may control the pitch through potentiometer 121. Switch 26 then is on a dead contact, and switch 27 shorts out any signals which might be generated at glide slope receiver 19. With switches 24—27 in their lower positions, therefore, the aircraft is under automatic control in azimuth, elevation, and roll from the two gyroscopes, supervised by the hand knobs 48 and 47. If, however, the pilot decides to fly under control in azimuth from omnidirectional radio range beams, he operates switch knob 23 to place switches 24—27 in their central positions. In this position, switch 24 disconnects the turn knob control 48 and connects the output of receiver 14 (tuned to a radio range transmitter) and its amplifier 17 to mixer 3. The glide slope receiver output, however, is still short-circuited by switch 27. Moreover, switch 25 still renders pitch knob 47 effective, and switch 26 still connects to a dead contact.

When the aircraft is approaching its destination and it is desired to land, the pilot tunes receiver 14 to the localizer beam at the landing field and operates switch knob 23 to place switches 24—27 in their upper positions. The output of amplifier 17 thereby remains connected through switch 24 to mixer 3, said amplifier then being under the control of the localizer beam. Switch 25 is then in the position shown in Fig. 2 in which the coil 46 of the pitch knob clutch is deenergized to disconnect the same. Switch 26 then arms or renders the go-around controller actuable should one or more of the switches 34a, 35a, 36 be operated. Moreover, the short-circuit across leads 105, 106 from the glide slope channel of the approach amplifier is broken at switch 27, so that the glide slope output is then mixed with the pitch signals from the vertical gyroscope 2 to operate elevator amplifier 11.

Thus, with switch knob 23 operated to place switches 24—27 in their upper positions, the go-around controller is in condition for the actuation thereof by either a pushbutton switch 36 or by one or the other, or both, of actuator relays 34, 35 having switch elements 34a, 35a, respectively. The actuator relays provide a means whereby the go-around controller may be actuated automatically as the result of an automatic evaluation of the aircraft's automatic approach. In this regard, relays 34, 35 are shown in Fig. 1 as being operable to actuate the go-around controller in response to one or more of a number of differently obtained signals. More particularly as to relay 34, with a selector switch 53 in the "Loc," position, a portion of the amplifier localizer displacement and rate signal is fed to a variable gain amplifier 54 so that relay 34 will be operated only when the localizer and rate signals attain some preselected value representing a threshold condition of safe flight beyond which a successful approach is unlikely. The signal output of a distance measuring device 56 is employed to gradually increase the gain of amplifier 54 as the aircraft approaches the landing field runway, thereby lowering the threshold values of localizer displacement and rate signals and effectively rendering relay 34 increasingly sensitive as the distance closes to the runway.

As is well known in radio-guided automatic pilots, a roll or bank signal derived from a vertical gyroscope is substantially equivalent to the sum of the localizer displacement and rate signals. Therefore, for an alternative and substantially equivalent arrangement, I have provided means whereby relay 34 may also be operated by a roll signal derived from the roll pick-off of vertical gyro 2, such operation being effected when the roll signal attains a preselected value representing a threshold condition of safe flight beyond which a successful approach is unlikely. Thus, with selector switch 53 in the "Roll" position, the input to variable gain amplifier 54 is switched from the displacement and rate output of localizer amplifier 17 to the bank output of said roll pick-off; and the threshold value of the bank signal for operating relay 34 is gradually lowered in the manner hereinabove recited for the combined localizer displacement and rate signals. While not shown, yet a third equivalent signal may be substituted for either of the aforesaid alternative signals. The third signal is a rate of yaw signal, and may be derived, for example, from a rate-type gyroscope sensitive about the craft yaw axis.

A preferred arrangement of the foregoing controls for relay 34 is represented in greater detail in Fig. 3. I have chosen to use an altitude sensitive device such as an altimeter 57 as my distance measuring device, since with a given radio-defined glide path the distance of any point along said glide path to the runway is a function of the altitude of that point. Altimeter 57 may be a conventional radio altimeter having a D. C. output preferably modulated by a modulator 58 so as to permit the use of a highly stable A. C. amplifier 59 for amplification. The altitude signal is then rectified by a suitable rectifying means 60 and is fed to the control grid of a variable gain type of pentode 61 for effectively controlling the gain of this tube. Through selector switch 53, either a roll signal or a combined localizer displacement and rate signal is also fed to the control grid of pentode 61 via a coupling capacitor 62. By this arrangement, the output of tube 61 is varied in accordance with the changing altitude of the aircraft as the craft is guided downwardly along the localizer and glide slope beams. Said output is coupled through a capacitor 63 to the grid of one half of a double triode amplifier stage 64. The output of the first half of tube 64 is again amplified by the second half and is fed via a coupling capacitor 65 to the grid of a double triode 66 whose elements are connected to form a power stage of the cathode follower type for energizing relay 34 via a suitable rectifying means 67.

In order to provide means whereby relay 34 will not be operated by other than sustained signals of preselected duration, I have provided a time delay selector device 68 which is settable manually to place a plurality of combinations of capacitors across the coil of relay 34. Thus, depending on the setting of selector knob 69, relay 34 can be made to operate for sustained signals of selected periods ranging, say, from one to five seconds. It has been found in practice that with switch 53 in the "Loc." position, a greater time delay is required than with the switch in the "Roll" position, since actual response of the aircraft to localizer control to produce a roll signal at vertical gyroscope 2 inherently lags several seconds behind the immediate sensing in receiver 14 of movement of the aircraft laterally of the localizer beam.

Returning to Fig. 1, depending on the position of a selector switch 71, relay 35 is operated through suitable rectifying means 55 by either the combined glide slope displacement and rate signal output of amplifier 22 or the combined pitch and glide slope displacement signal output of mixer-modulator 70 if such outputs attain preselected values representing a threshold condition of safe flight beyond which a successful approach is unlikely. As with relay 34, relay 35 thus may be energized by alternative inputs each of which is the substantial equivalent of the other. That is, it is well known that in a radio-guided automatic pilot, the pitch signal derived from the vertical gyroscope is substantially equivalent to the rate of glide slope displacement signal. Moreover, the limiting or threshold values of either of these signal combinations may be adjusted as a function of the distance of the aircraft to the runway in a manner similar to that hereinbefore described in connection with the alternative localizer and roll signals operating relay 34. In practice, however, I have found it unnecessary to vary the magnitude of the signal limits at which relay 35 will operate, since I have found that the narrowing of the glide slope beam as the runway is approached is in itself adequate for all practical purposes to provide the requisite increasing sensitivity for relay 35.

It is to be understood that relay 35 may also be made insensitive to other than sustained signals by means substantially similar to the time delay selector device 68 cooperating with relay 34. Thus, depending on the setting of a knob corresponding to selector knob 69, relay 35 can be made to operate for sustained signals of selected periods ranging, for example, from one to five seconds. Experiment has shown that with selector switch 71 in the "G. S. Rate" position, a greater time delay is required than with the switch in the "Pitch" position since actual response of the aircraft to glide slope control to produce a pitch signal at vertical gyroscope 2 inherently lags several seconds behind the immediate sensing in receiver 19 of movement of the aircraft vertically of the glide slope beam.

The hereinbefore described controlling arrangement for relays 34 and 35 constitutes means for automatically evaluating an automatic approach for probable success or failure. In evaluating the approach, said arrangement preferably accepts inputs of (1) a combined localizer displacement and rate signal, or, a roll signal, and (2) a combined glide slope displacement and rate signal, or, a combined pitch and glide slope displacement signal. Each signal or combination of signals is given a limiting value corresponding to a threshold condition of safe flight; and the exceeding of one or more of these values when go-around controller 18 is armed brings about an immediate operation of one or the other, or both, of relays 34 and 35 to actuate the go-around controller.

While the magnitudes of the different signal limits for operating relays 34, 35 are largely a matter of choice, depending on factors such as the type of aircraft employed and the degree of approach safety desired, satisfactory results have been obtained in one type of aircraft by choosing circuit elements providing limits corresponding to ten degrees of bank at a point over the middle marker beacon of a standard 2½ degree radio-defined glide path. This marker beacon vertically intersects the path at a point about 4300 feet along said path from the runway point of first acceptable touchdown. As the aircraft closes the 4300 foot distance, the gain of variable gain amplifier 61 is preferably linearly increased approximately five-fold so as continuously to decrease the relay-operating limit until it reaches a value corresponding to 2 degrees of bank just before arrival at the point of first acceptable touchdown. On the other hand, as hereinbefore stated, I prefer not to vary the maximum allowable combined pitch and glide-slope displacement on an automatic approach; and, accordingly, I have obtained highly satisfactory results by choosing circuit parameters which produce a fixed limit corresponding to approximately three degrees of pitch from trim.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radio-controlled automatic approach system for aircraft, an automatic pilot, a localizer receiver for providing a first control signal dependent upon movement of said craft laterally of a localizer beam, a glide slope receiver for providing a second control signal dependent on movement of said craft vertically relative to a glide slope beam, said localizer and glide slope beams serving to define an approach path for said craft, means normally connecting said control signals in controlling relation to said automatic pilot to tend to cause said craft to descend along said approach path, and monitoring control means controlled by said control signals for severing the normal connection of said control signals to said automatic pilot and for simultaneously adjusting said pilot to cause ascent of said craft when at least one of said signals attains a value corresponding to a preselected limit of safe craft movement relative to said approach path.

2. In a radio-controlled automatic approach system for aircraft, an automatic pilot, a localizer receiver for providing a first control signal dependent upon movement of said craft laterally of a localizer beam, a glide slope receiver for providing a second control signal dependent on movement of said craft vertically relative to a glide slope beam, said localizer and glide slope beams serving to define an approach path for said craft, means normally connecting said control signals in controlling relation to said automatic pilot to tend to cause said craft to descend along said approach path, and relay means controlled by said control signals for severing the normal connection of said control signals to said automatic pilot and for simultaneously adjusting said pilot to cause ascent of said craft.

3. The automatic approach system of claim 2, further including means for preventing said relay means from being actuated by control signals of less than a preselected duration of time.

4. In an automatic approach system for aircraft, an automatic pilot, radio receiving means normally connected to control said automatic pilot to tend to cause said craft to descend toward a landing field, said radio receiving means providing a control signal dependent upon craft displacement from a localizer beam, relay means, means to operate said relay in accordance with said control signal, and means controlled by said relay for severing said radio receiver means from control of said automatic pilot and for simultaneously adjusting said pilot to cause ascent of said craft.

5. In an automatic approach system for aircraft, an automatic pilot, radio receiving means normally connected to control said automatic pilot to tend to cause said craft to descend toward a landing field, said radio receiving means providing a control signal dependent upon craft displacement from a glide slope beam, relay means, means to operate said relay in accordance with said control signal, and means controlled by said relay for severing said radio receiver means from control of said automatic pilot and for simultaneously adjusting said pilot to cause ascent of said craft.

6. In an automatic approach system for aircraft, an automatic pilot, radio receiving means normally connected to control said automatic pilot to tend to cause said craft to descend toward a landing field along a radio-defined approach path, said radio receiving means providing a control signal dependent upon movement of said craft laterally of the radio-defined approach path, monitoring control means controlled by said control signal for severing said radio receiver means from control of said automatic pilot and for simultaneously adjusting said pilot to cause ascent of said craft when said signal attains a value corresponding to a preselected limit of safe craft movement relative to said approach path, and means for varying the limit at which said monitoring control means is rendered operative in accordance with the distance of the aircraft along the approach path from the runway.

7. In an automatic approach system for aircraft, an automatic pilot, radio receiving means normally connected to control said automatic pilot to tend to cause said craft to descend toward a landing field along a radio-defined approach path, said radio receiving means providing a control signal dependent upon movement of said craft laterally of the radio-defined approach path, monitoring control means controlled by said control signal for severing said radio receiver means from control of said automatic pilot and for simultaneously adjusting said pilot to cause ascent of said craft when said signal attains a value corresponding to a preselected limit of safe craft movement relative to said approach path, a variable gain device for varying the limit at which said monitoring control means is rendered operative, and means for varying the gain of said device in accordance with the distance of the aircraft along the approach path from the runway.

8. In an automatic approach system for aircraft, an automatic pilot, radio receiving means normally connected to control said automatic pilot to tend to cause said craft to descend toward a landing field along a radio-defined approach path, said radio receiving means providing a control signal dependent upon movement of said craft laterally of the radio-defined approach path, monitoring control means controlled by said control signal for severing said radio receiver means from control of said automatic pilot and for simultaneously adjusting said pilot to cause ascent of said craft when said signal attains a value corresponding to a preselected limit of safe craft movement relative to said approach path, a variable gain device for varying the limit at which said monitoring control means is rendered operative, and means for varying the gain of said device in accordance with the variations in aircraft altitude as said craft flies downwardly along the approach path toward the runway.

9. In a radio-controlled automatic approach system for aircraft, an automatic pilot, a localizer receiver for providing a first control signal dependent upon movement of said craft laterally of a localizer beam, a glide slope receiver for providing a second control signal dependent on movement of said craft vertically relative to a glide slope beam, said localizer and glide slope beams serving to define an approach path for said craft, means normally connecting said control signals in controlling relation to said automatic pilot to tend to cause said craft to descend along said approach path, a first and second relay, means to operate said first relay in accordance with said first control signal, means to operate said second relay in accordance with said second control signal, and means controlled by both of said relays for severing the normal connection of said control signals to said automatic pilot and for simultaneously adjusting said pilot to cause ascent of said craft.

10. In a radio-controlled automatic approach system for aircraft, an automatic pilot, a localizer receiver for providing a first control signal dependent upon movement of said craft laterally of a localizer beam, a glide slope receiver for providing a second control signal dependent on the displacement of said craft vertically relative to a glide slope beam, means connected to said glide slope receiver and responsive to the output thereof for providing a third control signal dependent upon the rate of change of craft displacement from said glide slope beam, said localizer and glide slope beams serving to define an approach path for said craft, means normally connecting said first, second and third control signals in controlling relation to said automatic pilot to tend to cause said craft to descend along said approach path, means for providing a fourth control signal dependent upon craft bank, means for providing a fifth control signal dependent upon craft pitch, and means responsive to said second control signal and one of said first and fourth control signals and one of said third and fifth control signals for severing the normal connection of said first, second and third control signals to said automatic pilot and for simultaneously adjusting said pilot to cause ascent of said craft.

11. In a radio-controlled automatic approach system for aircraft, an automatic pilot, a localizer receiver for providing a first control signal dependent upon movement of said craft laterally of a localizer beam, a glide slope receiver for providing a second control signal dependent on the displacement of said craft vertically relative to a glide slope beam, means connected to said glide slope receiver and responsive to the output thereof for providing a third control signal dependent upon the rate of change of craft displacement from said glide slope beam, said localizer and glide slope beams serving to define an approach path for said craft, means normally connecting said first, second and third control signals in controlling relation to said automatic pilot to tend to cause said craft to descend along said approach path, means for providing a fourth control signal dependent upon craft bank, means for providing a fifth control signal dependent upon craft pitch, a first and second relay, means to operate said first relay in accordance with one of said first and fourth control signals, means to operate the second relay in accordance with said second control signal and one of said third and fifth control signals, and means controlled by both of said relays for severing the normal connection of said first, second and third control signals to said automatic pilot and for simultaneously adjusting said pilot to cause ascent of said craft.

12. In a radio-controlled automatic approach system for aircraft, an automatic pilot, means including a localizer receiver for providing a first control signal dependent upon rate of change of craft displacement from a localizer beam, a glide slope receiver for providing a second control signal dependent on the displacement of said craft vertically relative to a glide slope beam, means connected to said glide slope receiver and responsive to the output thereof for providing a third control signal dependent upon rate of change of craft displacement from said glide slope beam, said localizer and glide slope beams serving to define an approach path for said craft, means normally connecting said first, second and third control signals in controlling relation to said automatic pilot to tend to cause said craft to descend along said approach path, means for providing a fourth control signal dependent upon craft bank, means for providing a fifth control signal dependent upon craft pitch, and means responsive to said second control signal and one of said first and fourth control signals and one of said third and fifth control signals for severing the normal connection of said first, second and third control signals to said automatic pilot and for simultaneously adjusting said pilot to cause ascent of said craft.

13. In a radio-controlled automatic approach system for aircraft, an automatic pilot, means including a localizer receiver for providing a first control signal dependent upon rate of change of craft displacement from a localizer beam, a glide slope receiver for providing a second control signal dependent on the displacement of said craft vertically relative to a glide slope beam, means connected to said glide slope receiver and responsive to the output thereof for providing a third control signal dependent upon rate of change of craft displacement from said glide slope beam, said localizer and glide slope beams serving to define an approach path for said craft, means normally connecting said first, second and third control signals in controlling relation to said automatic pilot to tend to cause said craft to descend along said approach path, means for providing a fourth control signal dependent upon craft bank, means for providing a fifth control signal dependent upon craft pitch, a first and second relay, means to operate said first relay in accordance with one of said first and fourth control signals, means to operate the second relay in accordance with said second control signal and one of said third and fifth control signals, and means controlled by both of said relays for serving the normal connection of said first, second and third control signals to said automatic pilot and for simultaneously adjusting said pilot to cause ascent of said craft.

14. In a radio-controlled automatic approach system for aircraft, an automatic pilot, a localizer receiver for providing a first control signal dependent upon movements of said craft laterally of a localizer beam, a glide slope receiver for providing a second control signal dependent on movements of said craft vertically relative to a glide slope beam, said localizer and glide slope beams serving to define an approach path for said craft, means normally connecting said first and second control signals in controlling relation to said automatic pilot to tend to cause said craft to descend along said approach path, means for providing a third control signal dependent upon craft bank, control means responsive to one of said first and third control signals and to said second control signal, and means controlled by said control means for severing the normal connection of said first and second control signals to said automatic pilot and for simultaneously adjusting said pilot to cause ascent of said craft upon operation of said control means.

15. In a radio-controlled automatic approach system for aircraft, an automatic pilot, means including a localizer receiver for providing a first control signal dependent upon rate of change of craft displacement from a localizer beam, a glide slope receiver for providing a second control signal dependent on the displacement of said craft vertically relative to a glide slope beam, means connected to said glide slope receiver and responsive to the output thereof for providing a third control signal dependent upon rate of change of craft displacement from said glide slope beam, said localizer and glide slope beams serving to define an approach path for said craft, means normally connecting said first, second and third control signals in controlling relation to said automatic pilot to tend to cause said craft to descend along said approach path, means for providing a fourth control signal dependent upon craft pitch, relay means, means to operate said relay means in accordance with said first control signal, means to operate said relay means in accordance with said second control signal and one of said third and fourth control signals, and means controlled by said relay means for severing the normal connection of said first, second and third control signals to said automatic pilot and for simultaneously adjusting said pilot to cause ascent of said craft upon operation of said relay means.

16. In a radio-controlled automatic approach system for aircraft, an automatic pilot, means including a localizer receiver for providing a first control signal dependent upon craft displacement and rate of change of craft displacement from a localizer beam, a glide slope receiver for providing a second control signal dependent upon craft displacement from a glide slope beam, means connected to said glide slope receiver and responsive to the output thereof for providing a third control signal dependent upon rate of change of craft displacement from the glide slope beam, said localizer and glide slope beams serving to define an approach path for said craft, means normally connecting said first, second and third control signals in controlling relation to said automatic pilot to tend to cause said craft to descend along said approach path, means for providing a fourth control signal dependent upon craft bank, means for providing a fifth control signal dependent upon craft pitch, a first and second relay, means for operating said first relay in accordance with one of said first and fourth control signals, mean for operating the second relay in accordance with said second control signal and one of said third and fifth control signals, and means controlled by both of said relays for severing the normal connection of said first, second and third control signals to said automatic pilot and for simultaneous adjusting said pilot to cause ascent of said craft upon an operation of either of said relays.

17. In a radio-controlled automatic approach system for aircraft, an automatic pilot, a localizer receiver for providing a first control signal dependent upon movement of said craft laterally of a localizer beam, a glide slope receiver for providing a second control signal dependent on movement of said craft vertically relative to a glide slope beam, said localizer and glide slope beams serving to define an approach path for said craft, means normally connecting said control signals in controlling relation to said automatic pilot to tend to cause said craft to descend along said approach path, monitoring control means controlled by said control signals for severing the normal connection of said control signals to said automatic pilot and for simultaneously adjusting said pilot to cause ascent of said craft when at least one of said signals attains a value corresponding to a preselected limit of safe craft movement relative to said localizer and glide slope beams, and means for varying the limit at which said control means is rendered operative in accordance with the distance of the aircraft along the approach path from the runway.

18. In a radio-controlled automatic approach system for aircraft, an automatic pilot, a localizer receiver for providing a first control signal dependent upon movement of said craft laterally of a localizer beam, a glide slope receiver for providing a second control signal dependent on movement of said craft vertically relative to a glide slope beam, said localizer and glide slope beams serving to define an approach path for said craft, means normally connecting said control signals in controlling relation to said automatic pilot to tend to cause said craft to descend along said approach path, monitoring control means controlled by said control signals for severing the normal connection of said control signals to said automatic pilot and for simultaneously adjusting said pilot to cause ascent of said craft when at least one of said signals attains a value corresponding to a preselected limit of said craft movement relative to said localizer and glide slope beams, a variable gain device for varying the limit at which said monitoring control means is rendered operative, and means for varying the gain of said device in accordance with the distance of the aircraft along the approach path from the runway.

19. In a radio-controlled automatic approach system for aircraft, an automatic pilot, a localizer receiver for providing a first control signal dependent upon movement of said craft laterally of a localizer beam, a glide slope receiver for providing a second control signal dependent on movement of said craft vertically relative to a glide slope beam, said localizer and glide slope beams serving to define an approach path for said craft, means normally connecting said control signals in controlling relation to said automatic pilot to tend to cause said craft to descend along said approach path, monitoring control means controlled by said control signals for severing the normal connection of said control signals to said automatic pilot and for simultaneously adjusting said pilot to cause ascent of said craft when at least one of said signals attains a value corresponding to a preselected limit of safe craft movement relative to said approach path, and means for varying the magnitude of at least one of said control signals in accordance with the distance of the aircraft along the approach path from the runway.

20. In a control system for aircraft, an automatic pilot, first means normally connected to control said automatic pilot to tend to cause said craft to travel along a given flight path, said first control means providing a first control signal dependent upon movement of said craft laterally of said flight path, second control means for providing a second control signal, and means controlled by said first control signal for disconnecting said first control means from control of said automatic pilot and for simultaneously connecting said second control means in controlling relation thereto when said first signal attains a value corresponding to a preselected limit of safe craft movement relative to said flight path.

21. In an automatic approach system for aircraft, an automatic pilot, radio receiving means for providing a first control signal dependent upon craft displacement from a glide slope beam, means for providing a second control signal dependent upon the rate of change of said displacement, means for normally connecting said control signals in controlling relation to said automatic pilot to tend to cause said craft to descend toward a landing field, and means controlled by said control signals for severing the normal connection of said signals to said automatic pilot and for simultaneously adjusting said pilot to cause ascent of said craft when said signals attain a value corresponding to a preselected limit of safe craft movement relative to said approach path.

22. In an automatic approach system for aircraft, an automatic pilot, radio-receiving means normally connected to said automatic pilot for controlling the latter to cause said craft to descend toward a landing field along a radio-defined approach path, said radio-receiving means providing a control signal dependent upon movement of said craft laterally of the radio-defined approach path, and means interposed in the connection between said radio-receiving means and said automatic pilot and responsive to said control signal for opening said connection and simultaneously adjusting said pilot to cause ascent of said craft when said signal attains a value corresponding to a preselected limit of safe craft movement relative to said approach path.

References Cited in the file of this patent
UNITED STATES PATENTS

| Number | Name | Date |
|---|---|---|
| Re. 16,181 | Hammond | Oct. 6, 1925 |
| 1,568,974 | Hammond | Jan. 12, 1926 |
| 2,393,624 | Ferrill | Jan. 29, 1946 |
| 2,489,248 | Abraham | Nov. 29, 1949 |
| 2,499,349 | Ayres | Mar. 7, 1950 |
| 2,595,250 | Harcum | May 6, 1952 |
| 2,611,128 | Pine et al. | Sept. 16, 1952 |
| 2,613,351 | Lang | Oct. 7, 1952 |
| 2,620,148 | Baring-Gould et al. | Dec. 2, 1952 |